United States Patent
Yang

(10) Patent No.: US 12,321,212 B1
(45) Date of Patent: Jun. 3, 2025

(54) CONTROL RIGHT HANDOVER METHOD AND APPARATUS FOR POWER MANAGEMENT, DEVICE, AND STORAGE MEDIUM

(71) Applicant: Suzhou MetaBrain Intelligent Technology Co., Ltd., Suzhou (CN)

(72) Inventor: Zhen Yang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/869,446

(22) PCT Filed: Mar. 23, 2023

(86) PCT No.: PCT/CN2023/083343
§ 371 (c)(1),
(2) Date: Nov. 26, 2024

(87) PCT Pub. No.: WO2024/113548
PCT Pub. Date: Jun. 6, 2024

(30) Foreign Application Priority Data

Nov. 28, 2022 (CN) .......................... 202211498267.9

(51) Int. Cl.
 *G06F 15/177* (2006.01)
 *G06F 1/3203* (2019.01)
 *G06F 9/4401* (2018.01)
(52) U.S. Cl.
 CPC .......... *G06F 1/3203* (2013.01); *G06F 9/4401* (2013.01); *G06F 9/4406* (2013.01)
(58) Field of Classification Search
 CPC .............................. G06F 1/3203; G06F 9/4401
 (Continued)

(56) References Cited

U.S. PATENT DOCUMENTS

| | | | | |
|---|---|---|---|---|
| 5,560,023 A | * | 9/1996 | Crump | .................... G06F 11/20 713/340 |
| 6,446,213 B1 | * | 9/2002 | Yamaki | .................. G06F 1/206 713/340 |

(Continued)

FOREIGN PATENT DOCUMENTS

| | | |
|---|---|---|
| CN | 1140272 A | 1/1997 |
| CN | 101281416 A | 10/2008 |

(Continued)

OTHER PUBLICATIONS

International Search Report and Written Opinion of corresponding PCT Application No. PCT/CN2023/083343 mailed Jul. 30, 2023 including English translations (12 pages).

(Continued)

*Primary Examiner* — Volvick Derose
(74) *Attorney, Agent, or Firm* — Crowell & Moring LLP

(57) ABSTRACT

The present application relates to a control right handover method and apparatus for power management, a device, and a storage medium. The method includes: adding power management handover option hardware-controlled performance states (HWP) in a basic input output system (BIOS) power management interface; setting an option value corresponding to the power management handover option HWP as Native Mode; saving Native Mode to an intermediate struct; and modifying bits of target registers in a central processing unit (CPU) according to the intermediate struct, whereby a control right for power management is handed over from a BIOS to an operating system (OS), and the OS acquires the control right for power management.

20 Claims, 7 Drawing Sheets

(58) Field of Classification Search
USPC ............................................................. 713/2
See application file for complete search history.

(56) References Cited

U.S. PATENT DOCUMENTS

| | | | | |
|---|---|---|---|---|
| 6,725,384 | B1* | 4/2004 | Lambino | G06F 9/4812 |
| | | | | 713/323 |
| 9,898,067 | B2* | 2/2018 | Distefano | G06F 1/3234 |
| 11,748,110 | B2* | 9/2023 | Tsao | G06F 8/65 |
| | | | | 713/2 |
| 11,847,009 | B1* | 12/2023 | Khosrowpour | G06F 11/3433 |
| 2006/0129852 | A1* | 6/2006 | Bonola | G06F 1/3203 |
| | | | | 713/300 |
| 2009/0307476 | A1* | 12/2009 | Khatri | G06F 1/26 |
| | | | | 713/2 |
| 2013/0173946 | A1* | 7/2013 | Rotem | G06F 1/3206 |
| | | | | 713/340 |
| 2014/0089688 | A1* | 3/2014 | Man | G06F 1/3206 |
| | | | | 713/300 |
| 2014/0281635 | A1* | 9/2014 | Reddy | G06F 1/3234 |
| | | | | 713/323 |
| 2015/0067373 | A1* | 3/2015 | So | G06F 1/3296 |
| | | | | 713/323 |
| 2016/0216754 | A1* | 7/2016 | Distefano | G06F 1/206 |
| 2019/0196573 | A1 | 6/2019 | Gupta et al. | |
| 2020/0225732 | A1* | 7/2020 | He | G06F 1/3296 |
| 2021/0357234 | A1* | 11/2021 | Banik | G06F 9/4406 |
| 2023/0280812 | A1* | 9/2023 | Hara | G06F 1/3209 |
| | | | | 713/320 |
| 2025/0045383 | A1* | 2/2025 | Montero | G06F 21/554 |
| 2025/0077100 | A1* | 3/2025 | Zhang | G06F 3/0634 |

FOREIGN PATENT DOCUMENTS

| | | |
|---|---|---|
| CN | 103946765 A | 7/2014 |
| CN | 104572164 A | 4/2015 |
| CN | 113064643 A | 7/2021 |
| CN | 113986361 A | 1/2022 |
| CN | 114168196 A | 3/2022 |
| CN | 114489865 A | 5/2022 |
| CN | 114528029 A | 5/2022 |
| CN | 115543055 A | 12/2022 |

OTHER PUBLICATIONS

Search Report of corresponding CN priority application (CN202211498267.9) Jan. 3, 2023 (3 pages).

First Office Action of corresponding CN priority application (CN202211498267.9) Jan. 9, 2023 including English translation (9 pages).

* cited by examiner

CONTROL RIGHT HANDOVER METHOD AND APPARATUS FOR POWER MANAGEMENT, DEVICE, AND STORAGE MEDIUM

CROSS-REFERENCE TO RELATED APPLICATION

This application is the national phase application of International Application No. PCT/CN2023/083343, filed Mar. 23, 2023, which claims priority to Chinese Patent Application No. 202211498267.9, filed on Nov. 28, 2022 in China National Intellectual Property Administration and entitled "Control Right Handover Method and Apparatus for Power Management, Device, and Storage Medium". The contents of International Application No. PCT/CN2023/083343 and Chinese Patent Application No. 202211498267.9 are incorporated herein by reference in their entireties.

FIELD

The present application relates to a control right handover method and apparatus for power management, a computer device, and a storage medium.

BACKGROUND

With the rapid advancement of server technology, ease of use, performance, and functionality are continually improved. Energy efficiency management capability has become a crucial index to measure server performance, and one method to achieve energy efficiency management capability is advanced power management (APM). APM is a mechanism that controls power usage based on the current activities of the system.

In traditional technology, the control right of APM lies with a basic input output system (BIOS). However, the inventor has recognized that relying on the BIOS to control APM prevents users from tailoring the APM according to their actual needs.

SUMMARY

According to various embodiments disclosed in the present application, a control right handover method for power management is provided, including:
adding a power management handover option in a BIOS power management interface;
setting an option value corresponding to the power management handover option as Native Mode;
saving Native Mode to an intermediate struct; and
modifying bits of target registers in a central processing unit (CPU) according to the intermediate struct, whereby a control right for power management is handed over from a BIOS to an operating system (OS), and the OS acquires the control right for power management.

A control right handover apparatus for power management is provided, including:
an addition module, configured to add a power management handover option in a BIOS power management interface;
a setting module, configured to set an option value corresponding to the power management handover option as Native Mode;
a saving module, configured to save Native Mode to an intermediate struct; and
a modification module, configured to modify bits of target registers in a central processing unit (CPU) according to the intermediate struct, whereby a control right for power management is handed over from a BIOS to an operating system (OS), and the OS acquires the control right for power management.

A computer device includes a memory, a processor, and computer-readable instructions stored on the memory and executable on the processor that, when executing the computer-readable instructions, implements steps of the above control right handover method for power management.

A non-volatile computer-readable storage medium stores thereon computer-readable instructions that, when executed by a processor, implement steps of the above control right handover method for power management.

The details of one or more embodiments of the present application are outlined in the drawings and the description below. Other features and advantages of the present application will be apparent from the description, drawings, and claims.

BRIEF DESCRIPTION OF THE DRAWINGS

To explain the embodiments of the present application or the technical solutions in the prior art more clearly, a brief introduction will be made to the drawings used in the embodiments or the description of the prior art. It is obvious that the drawings in the description below are only some embodiments of the present application, and those ordinarily skilled in the art might obtain other drawings according to these drawings without creative work.

DETAILED DESCRIPTION

To make the purpose, technical solution, and advantages of the present application clearer, the present application is further described in detail in combination with the drawings and embodiments. It should be understood that the specific embodiments described are illustrative only and are not restrictive for the present application.

Figure 1:
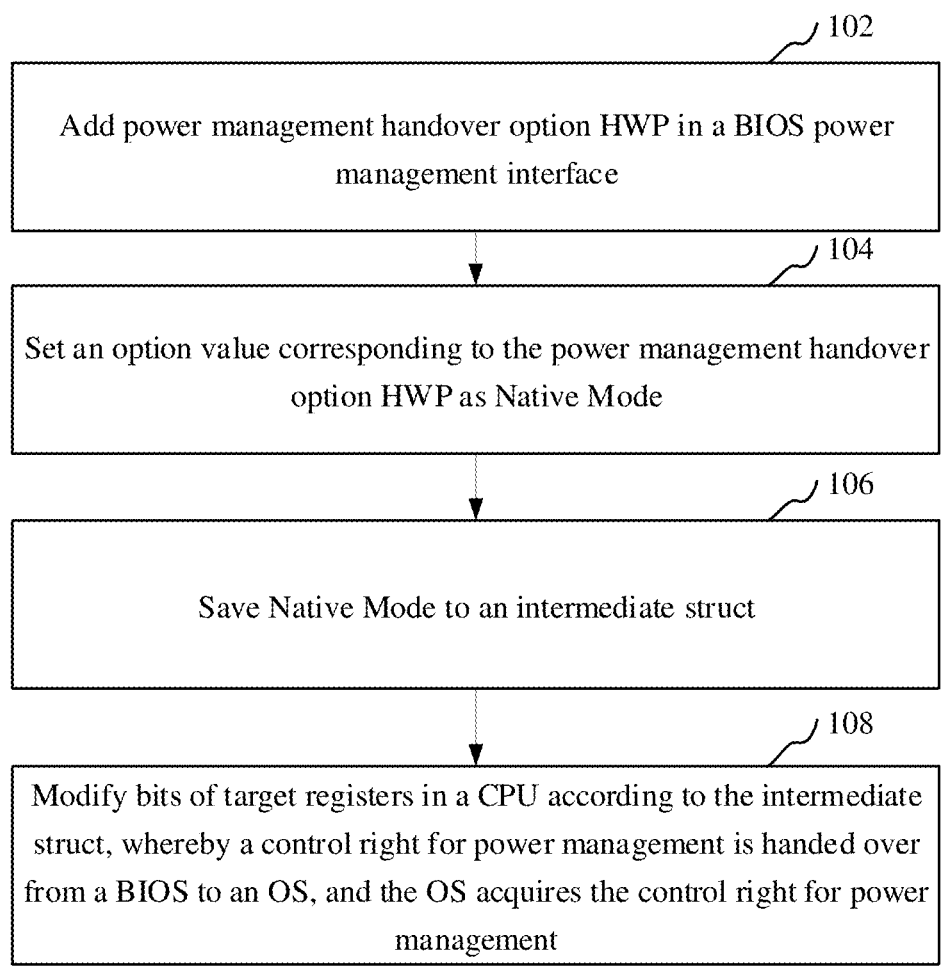
FIG. 1 is a flow diagram of a control right handover method for power management in one or more embodiments.

In one or more embodiments, as shown in FIG. 1, a control right handover method for power management is provided, including the following steps:

Step 102: Add power management handover option hardware-controlled performance states (HWP) in a BIOS power management interface.

BIOS, as a manager of underlying and direct hardware settings and control of the motherboard of the server, might provide more simple and easy-to-use functions for the server. BIOS is a set of programs that are fixed to a read-only memory (ROM) chip on the motherboard. It stores the most important basic input and output programs of the computer, system setting information, power on self-test programs, and system self-booting programs. Its main function is to provide the underlying and direct hardware settings and control for the computer.

The BIOS power management interface is a power management menu provided by the BIOS; a power management handover option is added in the BIOS power management interface, and the power management handover option may be custom-named using HWP, and the naming is so because the setting of the power management handover option is realized based on HWP technology; the power management handover option is an option configured to set the BIOS to hand over the control right for the power management to the OS; in the following, the power management handover option is also referred to as the power management handover option HWP. A processor supporting HWP technology might automatically select an appropriate performance state (P-State) according to performance instruction prompt information provided by the OS. The enhanced intel speed step technology (EIST) provides a method for the OS to control and monitor each independent dominant frequency-based operating point via the IA23_PERF_CTL instruction and the IA32_PERF_STATUS MSR instruction.

In contrast, HWP technology is an implementation of the advanced configuration and power interface (ACPI)-defined collaborative processor performance control (CPPC), which specifies that the platform enumerates a continuous, abstract unit-less, performance value scale that is not tied to a specific performance state/frequency by definition. While the enumerated scale is roughly linear in terms of a delivered integer workload performance result, the OS is required to characterize the performance value range to comprehend the delivered performance for an applied workload.

Step 104: Set an option value corresponding to the power management handover option HWP as Native Mode.

There are four option values corresponding to the power management handover option HWP, namely, Disabled, Native Mode, Native Mode with No Legacy Support, and Out of Band Mode.

In one or more embodiments, when the option value corresponding to the power management handover option HWP is Disabled, the OS adjusts the HWP through a conventional ACPI.

The ACPI is configured to manage various components inside the server to save energy as much as possible.

In one or more embodiments, when the option value corresponding to the power management handover option HWP is Native Mode with No Legacy Support, the OS does not make any setting adjustment on power, and the BIOS acquires the control right for power management.

In one or more embodiments, when the option value corresponding to the power management handover option HWP is Out of Band Mode, the power management handover option HWP are set through a baseboard management controller (BMC), and the BMC acquires the control right for power management.

That is, to hand over the control right of the power management from the BIOS to the OS, the option value corresponding to the power management handover option HWP may be set as Native Mode; when the option value is set as Native Mode, the OS configures the energy efficiency target via a hardware support package (HWP) interface, thereby controlling the power management. The option value corresponding to the power management handover option is Native Mode, and the OS may configure the energy efficiency target via the HWP interface; the processing automatically adjusts the power state relying on the setting of the OS.

Step 106: Save Native Mode to an intermediate struct.

In some embodiments, after setting an option value corresponding to the power management handover option HWP, the option value is combined with the power management handover option HWP to form an intermediate struct; alternatively, the power management handover option HWP has a corresponding struct associated therewith, and the option value of Native Mode is saved to the struct associated with the HWP to obtain the intermediate struct. For example, the intermediate struct may be HWP-Native Mode.

In one or more embodiments, the intermediate struct includes an intermediate struct variable and an intermediate struct variable value, the intermediate struct variable being the power management handover option HWP and the intermediate struct variable value being Native Mode.

The intermediate struct includes an intermediate struct variable and a corresponding intermediate struct variable value; the intermediate struct variable is set as power management handover option HWP and the corresponding intermediate struct variable value is set as Native Mode to obtain the intermediate struct. When the value corresponding to HWP is set as Native Mode, the OC may configure the energy efficiency target through the hardware power management (HWPM) interface, and the processor automatically adjusts the P-State depending on the setting of the OC. While the OS knows the control register of the HWP through the ACPI_CPC object, the HWP may be granted to pass various settings and constraints.

Step 108: Modify bits of target registers in a CPU according to the intermediate struct, whereby a control right for power management is handed over from a BIOS to an OS, and the OS acquires the control right for power management.

In some embodiments, after obtaining the intermediate struct, the right to modify the register in the CPU is acquired; therefore, the bits of the target registers in the CPU are modified according to the intermediate struct; the CPU includes a plurality of registers. The inherent register mechanism of the CPU might modify the bits of the target registers in the CPU according to the intermediate struct, and the target register may be a register for controlling power management. In some embodiments, bits of the target registers in the CPU are determined according to the intermediate struct, and the determined bits of the target registers may be modified; after the bits of the target registers in the CPU are modified according to the intermediate struct, the control right for power management is successfully handed over from the BIOS to the OS, and the OS acquires the control right for power management.

The OS is a set of interrelated system software programs that host and control computer operations, exercise, run hardware and software resources, and provide public services to organize user interactions. When the BIOS hands over the control right for power management to the OS with APM functions, it enables the user to set the OS according to their actual needs.

In the above control right handover method for power management, power management handover option HWP needs to be added under a BIOS power management interface; an option value corresponding to the power management handover option HWP is set to Native Mode and is saved in an intermediate struct; bits of the target registers in the CPU are modified according to the option value of the power management handover option HWP in the intermediate struct, namely, the states of the target registers in the CPU are updated according to the option value of the power management handover option HWP in the intermediate struct, which enables the BIOS to hand over the control right for APM to the OS, and OS successfully acquires the control right for power management, whereby users might tailor the APM according to their actual needs.

Figure 2:
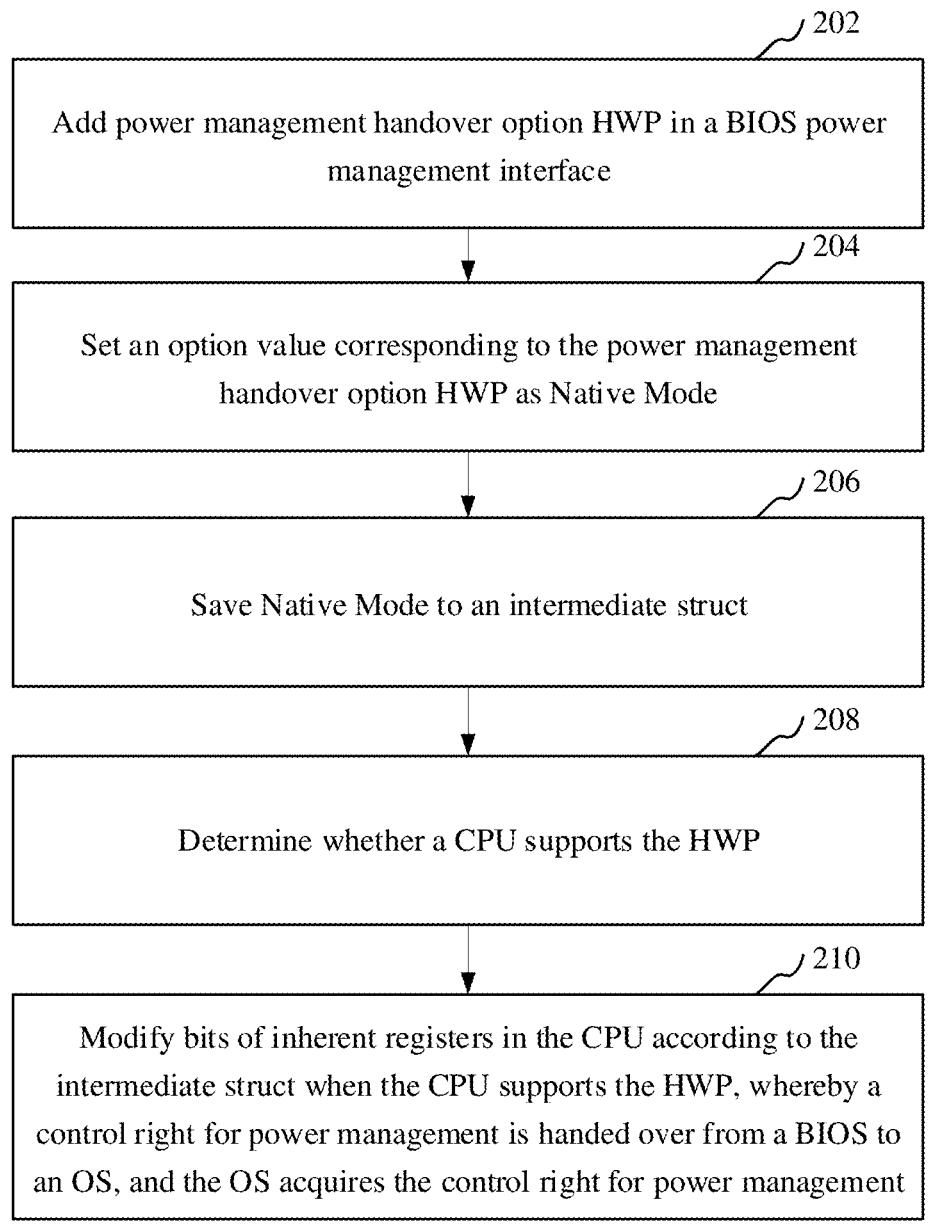
FIG. 2 is a flow diagram of a control right handover method for power management in another one or more embodiments.

In one or more embodiments, as shown in FIG. 2, a control right handover method for power management is provided, including the following steps:

Step 202: Add power management handover option hardware-controlled performance states (HWP) in a BIOS power management interface.

Step 204: Set an option value corresponding to the power management handover option HWP as Native Mode.

Step 206: Save Native Mode to an intermediate struct.

In some embodiments, the BIOS provides a power management page, and power management handover option HWP are added to the power management page provided by the BIOS; the power management handover option HWP are configured to configure control right handover of power management; there is a plurality of option values in the power management handover option HWP, and the option value of the power management handover option HWP is set as Native Mode. Furthermore, when the option value of the power management handover option HWP is set to Native Mode, the OS may perform configuration via the HWP interface to control power management; therefore, finally, the power management handover option HWP and the corresponding option value Native Mode are saved as a struct to obtain an intermediate struct.

Step 208: Determine whether the CPU supports the HWP.

Step 210: Modify bits of inherent registers in the CPU according to the intermediate struct when the CPU supports the HWP, whereby a control right for power management is handed over from a BIOS to an OS, and the OS acquires the control right for power management.

In some embodiments, it is determined whether the CPU supports the HWP; the hardware includes but is not limited to a power, a CPU, a platform controller hub (PCH), and a motherboard; it may be determined whether the CPU supports the HWP by querying the register state in the CPU; and if so, the step of modifying bits of inherent registers in the CPU according to the intermediate struct may be performed. Namely, only when the CPU supports the HWP, since the option settings of the BIOS are all saved in the intermediate struct, and then communicate with the CPU, to modify the bits of the inherent registers in the CPU according to the intermediate struct, and finally, the control right for power management is successfully handed over from the BIOS to the OS, and the OS acquires the control right for power management.

Conversely, when the CPU does not support the HWP, the flow ends and the bits of the inherent registers in the CPU might not be modified according to the intermediate struct.

Figure 3:
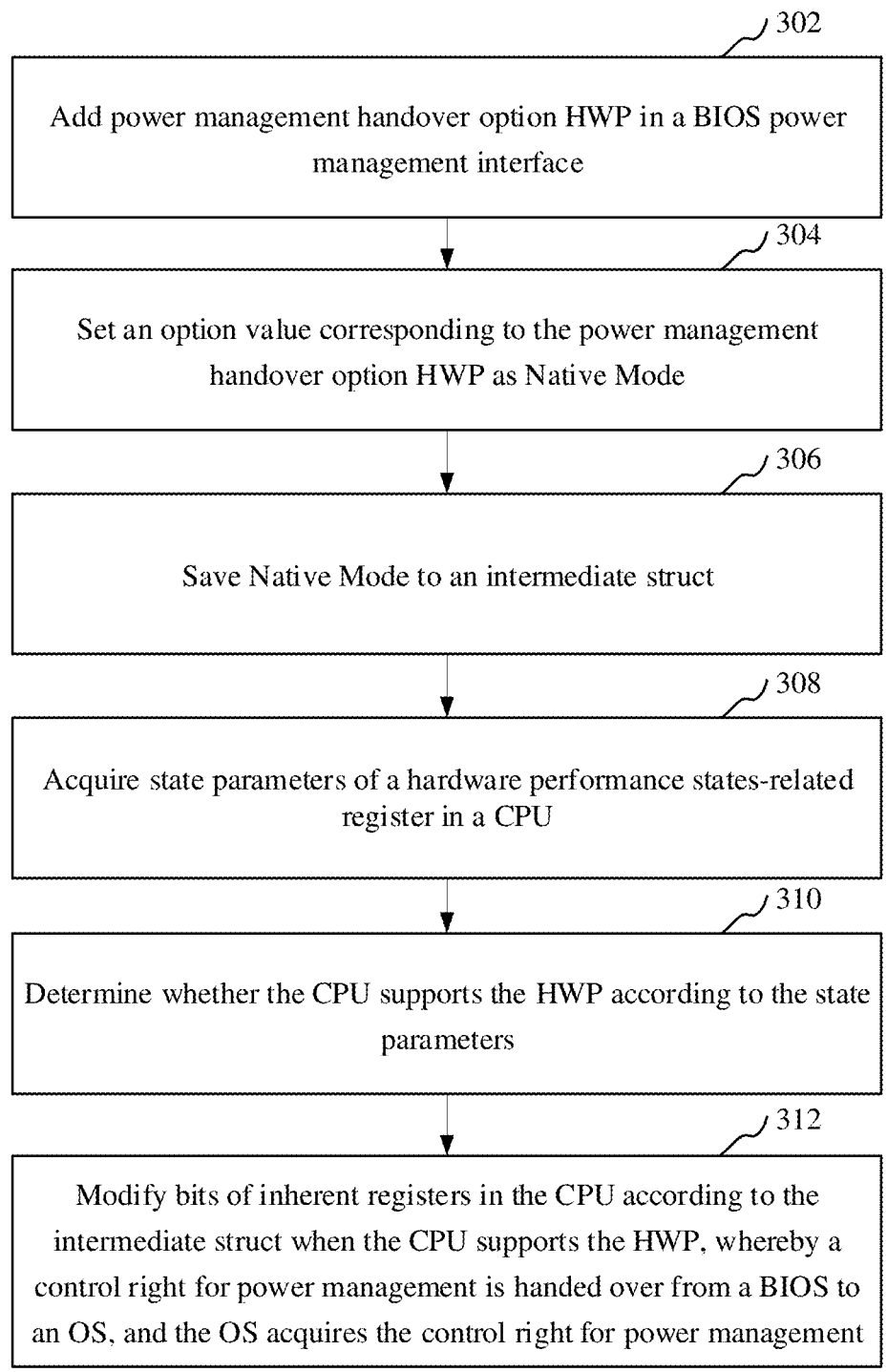
FIG. 3 is a flow diagram of a control right handover method for power management in yet another one or more embodiments.

In one or more embodiments, as shown in FIG. 3, a control right handover method for power management is provided, including the following steps:

Step 302: Add power management handover option hardware-controlled performance states (HWP) in a BIOS power management interface.

Step 304: Set an option value corresponding to the power management handover option HWP as Native Mode.

Step 306: Save Native Mode to an intermediate struct.

In some embodiments, power management handover option HWP are added to the power management page provided by the BIOS; the power management handover option HWP are configured to configure control right handover of power management; there are a plurality of option values in the power management handover option HWP, and the option value of the power management handover option HWP is set as Native Mode.

Furthermore, when the option value of the power management handover option HWP is set to Native Mode, the OS may successfully control power management; therefore, finally, the power management handover option HWP and the corresponding option value Native Mode are saved as a struct to obtain an intermediate struct.

Step 308: Acquire state parameters of a hardware performance states-related register in the CPU.

Step 310: Determine whether the CPU supports the HWP according to the state parameters.

Step 312: Modify bits of inherent registers in the CPU according to the intermediate struct when the CPU supports the HWP, whereby a control right for power management is handed over from a BIOS to an OS, and the OS acquires the control right for power management.

The step of determining whether the CPU supports the HWP may be in some embodiments as follows: Since the CPU is an inherent register mechanism, state parameters of a hardware performance states-related register in the CPU may be acquired; by analyzing the state parameters, it is determined whether the CPU supports the HWP.

Furthermore, after determining that the CUP supports the HWP according to the state parameters, the bits of the inherent registers in the CPU may be modified according to the intermediate struct; after the bits of the target registers in the CPU are modified according to the intermediate struct, the control right for power management is successfully handed over from the BIOS to the OS, and the OS acquires the control right for power management.

Figure 4:
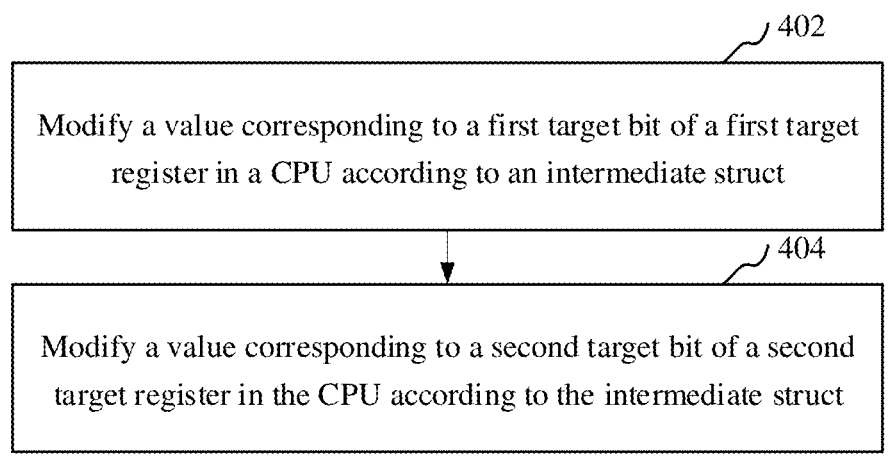
FIG. 4 is a flow diagram of operation steps on bits of target registers in one or more embodiments.

In one or more embodiments, as shown in FIG. 4, the modifying the bits of the target registers in the CPU according to the intermediate struct includes:

Step 402: Modify a value corresponding to a first target bit of a first target register in the CPU according to the intermediate struct.

The CPU includes a plurality of registers, and different registers correspond to different functions; after obtaining the intermediate struct, the users might communicate with the CPU, and then acquire the right to modify the registers in the CPU. In some embodiments, after obtaining the intermediate struct, a power management control-related register is determined, namely, a first target register, in the CPU according to the intermediate struct; an address and all corresponding bits of the first target register are determined, and each bit of the register has a corresponding value.

Further, a value corresponding to a first target bit of the first target register in the CPU is modified according to the intermediate struct.

In one or more embodiments, the modifying a value corresponding to a first target bit of a first target register in the CPU according to the intermediate struct includes: setting the value corresponding to the first target bit of the first target register in the CPU to 1 according to the intermediate struct.

The step of modifying a value corresponding to a first target bit of a first target register in the CPU according to the intermediate struct may in some embodiments be as follows: The value corresponding to the first target bit of the first target register in the CPU is set to 1 according to the intermediate struct, whereby the OS may obtain the control right for power management, which mainly depends on the inherent register mechanism of the CPU.

In one or more embodiments, the first target register may be MSR_MISC_PWR_MGMT.

In one or more embodiments, an address of the first target register may be 0x1AA.

In one or more embodiments, the first target bit may be a sixth bit.

For example, the Bit[6] of the first target register MSR_MISC_PWR_MGMT (0x1AA) in the CPU is set to 1 according to the intermediate struct variable, where 0x1AA is the address of the first target register and Bit[6] is the sixth bit in the first target register.

Step 404: Modify a value corresponding to a second target bit of a second target register in the CPU according to the intermediate struct.

The power management control right-related register in the CPU includes a second target register in addition to the first target register, and the value corresponding to the second target bit of the second target register in the CPU may be modified according to the intermediate struct. When the target bits of the first target register and the second target register in the CPU are all operated, the OS successfully acquires the control right for power management, and the BIOS successfully hands over the control right for power management to the OS.

In one or more embodiments, the modifying a value corresponding to a second target bit of a second target register in the CPU according to the intermediate struct includes: setting the value corresponding to the second target bit of the second target register in the CPU to 1 according to the intermediate struct.

The step of modifying a value corresponding to a second target bit of a second target register in the CPU according to the intermediate struct may in some embodiments be as follows: The value corresponding to the second target bit of the second target register in the CPU is set to 1 according to the intermediate struct, whereby the OS may obtain the control right for power management, which mainly depends on the inherent register mechanism of the CPU.

In one or more embodiments, the second target register is MSR_IA32_PM_ENABLE.

In one or more embodiments, the address of the second target register is 0x770.

In one or more embodiments, the second target bit is a $0^{th}$ bit.

For example, the Bit[0] of the second target register MSR_IA32_PM_ENABLE(0x770) in the CPU is set to 1 according to the intermediate struct variable, where 0x770 is the address of the second target register and Bit[0] is the $0^{th}$ bit in the second target register.

Figure 5:
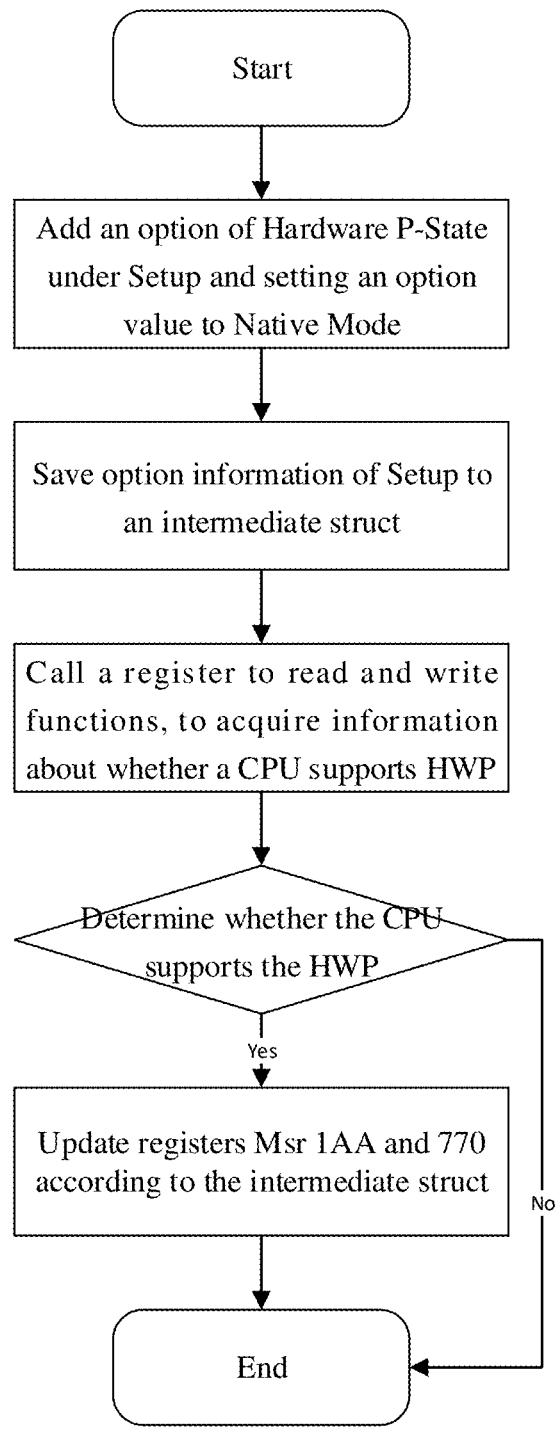
FIG. 5 is a schematic diagram of a control right handover method for power management in one or more embodiments.

In a specific embodiment, as shown in FIG. 5, FIG. 5 shows a schematic diagram of a control right handover method for power management in one or more embodiments, in some embodiments including the following steps:
1. The BIOS power management menu adds the option HWP to hand over the power control management policy to the OS.
2. The option values include Disabled, Native Mode, Out of Band Mode, and Native Mode with No Legacy Support.
3. Under the power management menu Setup, the option value is Native Mode, and the option value is saved to the struct variable.
4. The information about whether the CPU supports the HWP is acquired.
5. When the CPU supports the HWP, Bit[6] of the register MSR_MISC_PWR_MGMT (1AA) and Bit[0] of MSR_IA32_PM_ENABLE (770) are set to 1 according to the struct variable in 3, whereby the OS acquires the control right for power management policy.

It should be understood that, although the various steps in the above flowcharts are shown sequentially as indicated by the arrows, these steps are not necessarily performed sequentially in the order indicated by the arrows. The steps are performed in no strict order unless explicitly stated herein, and the steps may be performed in other orders. Moreover, at least some of the steps in the above flowcharts may include a plurality of sub-steps or stages that are not necessarily performed at the same time but may be performed at different times, and the order in which the sub-steps or stages are performed may not be sequential but may be performed in turn or alternation with other steps or at least some of the sub-steps or stages of other steps.

Figure 6:
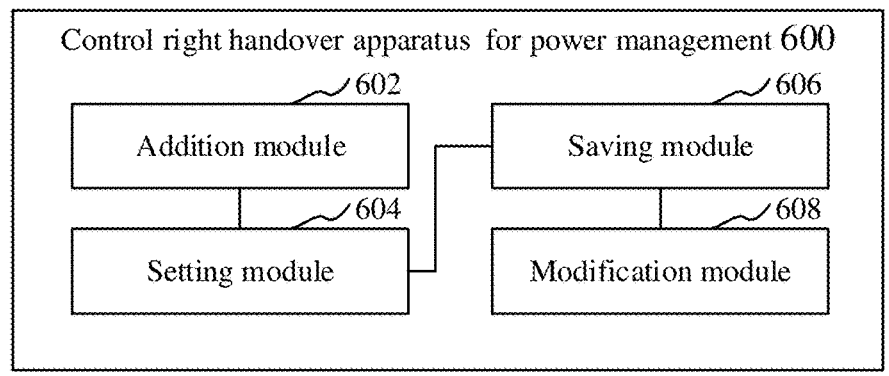
FIG. 6 is a structural block diagram of a control right handover apparatus for power management in one or more embodiments.

In one or more embodiments, as shown in FIG. 6, a control right handover apparatus 600 for power management is provided, including an addition module 602, a setting module 604, a saving module 606, and a modification module 608.

The addition module 602 is configured to add power management handover option HWP in a BIOS power management interface.

The setting module 604 is configured to set an option value corresponding to the power management handover option HWP as Native Mode.

The saving module 606 is configured to save Native Mode to an intermediate struct.

The modification module 608 is configured to modify bits of target registers in a CPU according to the intermediate struct, whereby a control right for power management is handed over from a BIOS to an OS, and the OS acquires the control right for power management.

In one or more embodiments, the option values corresponding to the power management handover option HWP further include any one of Disabled, Native Mode with No Legacy Support, and Out of Band Mode.

In one or more embodiments, when the option value corresponding to the power management handover option HWP is Disabled, the OS adjusts the HWP through a conventional ACPI.

In one or more embodiments, when the option value corresponding to the power management handover option HWP is Native Mode with No Legacy Support, the OS does not make any setting adjustment on power, and the BIOS acquires the control right for power management.

In one or more embodiments, when the option value corresponding to the power management handover option HWP is Out of Band Mode, the power management handover option HWP are set through a BMC, and the BMC acquires the control right for power management.

In one or more embodiments, the intermediate struct includes an intermediate struct variable and an intermediate struct variable value, the intermediate struct variable being the power management handover option HWP and the intermediate struct variable value being Native Mode.

In one or more embodiments, the control right handover apparatus 600 for power management determines whether the CPU supports the HWP, and when the CPU supports it, the modification module 608 performs the step of modifying bits of inherent registers in the CPU according to the intermediate struct when the CPU supports the HWP.

In one or more embodiments, the control right handover apparatus 600 for power management acquires state parameters of a hardware performance states-related register in the CPU and determines whether the CPU supports the HWP based on the state parameters.

In one or more embodiments, the modification module 608 modifies a value corresponding to the first target bit of the first target register in the CPU according to the intermediate struct and modifies a value corresponding to the second target bit of the second target register in the CPU according to the intermediate struct.

In one or more embodiments, the modification module 608 sets the value corresponding to the first target bit of the first target register in the CPU to 1 according to the intermediate struct.

In one or more embodiments, the first target register is MSR_MISC_PWR_MGMT.

In one or more embodiments, the address of the first target register is 0x1AA.

In one or more embodiments, the first target bit is a sixth bit.

In one or more embodiments, the modification module 608 sets the value corresponding to the second target bit in the second target register in the CPU to 1 according to the intermediate struct.

In one or more embodiments, the second target register is MSR_IA32_PM_ENABLE.

In one or more embodiments, the address of the second target register is 0x770.

In one or more embodiments, the second target bit is a $0^{th}$ bit.

For the specific definition of the control right handover apparatus for power management, reference may be made to the above definition of the control right handover method for power management, which will not be described in detail herein. The respective modules in the above control right handover apparatus for power management may be implemented in whole or in part by software, hardware, or a combination thereof. The modules may be embedded in the hardware form or independent of the processor in the computer device or may be stored in the software form in the memory of the computer device, whereby the processor schedules to perform the operations corresponding to the above modules.

Figure 7:
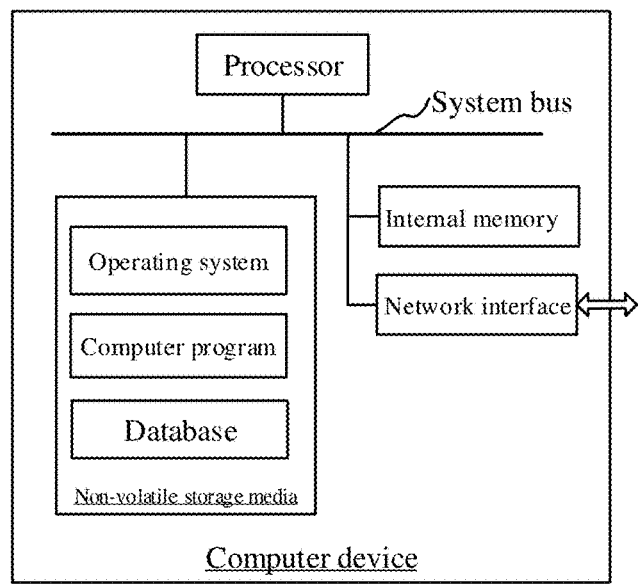
FIG. 7 is an internal structural diagram of a computer device in one or more embodiments.

In one or more embodiments, a computer device is provided, which may be a server, the internal structural diagram of which may be shown in FIG. 7. The computer device includes a processor, a memory, a network interface, and a database connected via a system bus. The processor of the computer device is configured to provide computing and control capabilities. The memory of the computer device includes a non-volatile storage medium and an internal memory. The non-volatile storage medium stores an OS, computer-readable instructions, and a data library. The internal memory provides an environment for the operation of the OS and computer-readable instructions in the non-volatile storage medium. The database of the computer device is configured to store the intermediate struct. The network interface of the computer device is configured to communicate with an external terminal via a network connection. The computer-readable instructions, when executed by the processor, implement a control right handover method for power management.

Figure 8:
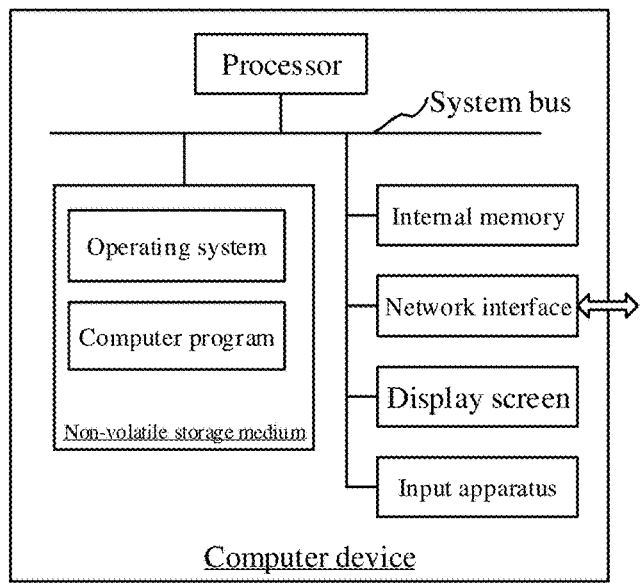
FIG. 8 is an internal structural diagram of a computer device in one or more embodiments.

In one or more embodiments, a computer device is provided, which may be a terminal, the internal structural diagram of which may be as shown in FIG. 8. The computer device includes a processor, a memory, a network interface, a display screen, and an input apparatus connected by a system bus. The processor of the computer device is configured to provide computing and control capabilities. The memory of the computer device includes a non-volatile storage medium and an internal memory. The non-volatile storage medium stores an OS and computer-readable instructions. The internal memory provides an environment for the operation of the OS and computer-readable instructions in the non-volatile storage medium. The network interface of the computer device is configured to communicate with an external terminal via a network connection. The computer-readable instructions, when executed by the processor, implement a control right handover method for power management. The display screen of the computer device may be a liquid crystal display screen or an electronic ink display screen; the input apparatus of the computer device may be a touch layer covered on the display screen, and may also be a key, a trackball, or a touch pad arranged on the housing of the computer device, and may also be an external keyboard, a touchpad, a mouse, or the like.

It will be appreciated by the skilled in the art that the structure in FIG. 7 or FIG. 8 is merely a block diagram of a portion of the structure relevant to the solutions of the present application and does not constitute a limitation on the computer device to which the solutions of the present application applies; and that a specific computer device may include more or fewer components than those shown in the drawings, or may combine certain components, or may have a different arrangement of components.

In one or more embodiments, a computer device is provided that includes a memory, a processor, and computer-readable instructions stored on the memory and executable on the processor; the processor, when executing the computer-readable instructions, performs steps of any one of the above method embodiments.

Figure 9:
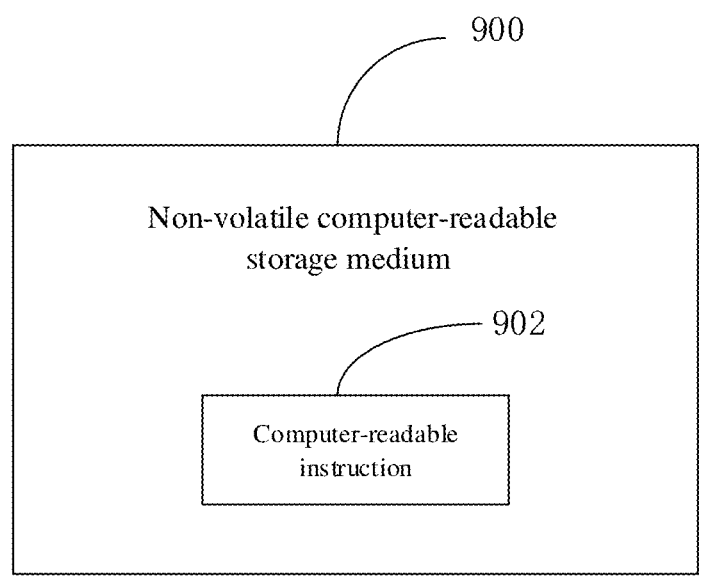
FIG. 9 is a structural diagram of a non-volatile computer-readable storage medium in one or more embodiments.

In one or more embodiments, as shown in FIG. 9, a non-volatile computer-readable storage medium 900 is provided; the non-volatile computer-readable storage medium stores thereon computer-readable instructions 902; the computer-readable instructions 902, when executed by a processor, perform steps of any one of the above method embodiments.

It will be appreciated by the ordinarily skilled in the art that implementing all or part of the flow of the methods of the above embodiments may be accomplished by controlling the associated hardware through the computer-readable instructions; the computer-readable instructions may be stored on a non-volatile computer-readable storage medium; the computer-readable instructions, when executed, may include the flow of the embodiments of the above methods. Any references to the memory, storage, database, or other media used in the embodiments provided by the present application may include a non-volatile and/or volatile memory. The non-volatile memory may include ROM, programmable ROM (PROM), electrically programmable ROM (EPROM), electrically erasable programmable ROM (EEPROM), or flash memory. The volatile memory may include random-access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SyncLink DRAM (SLDRAM), Rambus DRAM (RDRAM), and direct Rambus DRAM (DRDRAM).

Each of the technical features of the above embodiments may be arbitrarily combined. For the sake of concise description, all possible combinations of each of the technical features in the above embodiments have not been described. However, as long as there is no contradiction between the combinations of these technical features, they shall be considered as the scope of the specification.

The embodiments described above represent only several implementations of the present application, and their descriptions are specific and detailed, but they might not be interpreted as a limitation on the scope of the present application. It should be noted that several variations and modifications may be made by the ordinarily skilled in the art without departing from the concept of the present application, which is within the scope protection of the present application. Therefore, the scope of protection of the patent for the present application shall be subject to the attached claims.

What is claimed is:

1. A control right handover method for power management, being applied to a server, the method comprising:
    adding a power management handover option in a basic input output system (BIOS) power management interface;
    setting an option value corresponding to the power management handover option as a Native Mode;
    saving the Native Mode to an intermediate struct, the intermediate struct comprises an intermediate struct variable and an intermediate struct variable value, the intermediate struct variable being the power management handover option and the intermediate struct variable value being the Native Mode; and
    modifying bits of target registers in a central processing unit (CPU) according to the intermediate struct when the CPU supports the hardware-controlled performance states, whereby a control right for power management is handed over from a BIOS to an operating system (OS), and the OS acquires the control right for power management.

2. The method according to claim 1, wherein option values corresponding to the power management handover option further comprise any one or more of a Disabled Mode, a Native Mode with No Legacy Support, and an Out of Band Mode.

3. The method according to claim 2, wherein when the option value corresponding to the power management handover option is the Disabled Mode, the OS adjusts the power management handover option through a conventional advanced configuration and power interface (ACPI).

4. The method according to claim 2, wherein when the option value corresponding to the power management handover option is the Native Mode with No Legacy Support, the OS does not make setting adjustments on power, and the BIOS acquires the control right for power management.

5. The method according to claim 2, wherein when the option value corresponding to the power management handover option is the Out of Band Mode, the power management handover option is set through a baseboard management controller (BMC), and the BMC acquires the control right for power management.

6. The method according to claim 1, wherein after the saving Native Mode to an intermediate struct, the method further comprises:
    determining whether the CPU supports hardware-controlled performance states.

7. The method according to claim 6, wherein the determining whether the CPU supports the hardware-controlled performance states comprises:
    acquiring state parameters of a hardware performance states-related register in the CPU; and
    determining whether the CPU supports the hardware-controlled performance states according to the state parameters.

8. The method according to claim 1, wherein the modifying bits of target registers in a CPU according to the intermediate struct comprises:
    modifying a value corresponding to a first target bit of a first target register in the CPU according to the intermediate struct; and
    modifying a value corresponding to a second target bit of a second target register in the CPU according to the intermediate struct.

9. The method according to claim 8, wherein the modifying a value corresponding to a first target bit of a first target register in the CPU according to the intermediate struct comprises:
    setting the value corresponding to the first target bit of the first target register in the CPU to 1 according to the intermediate struct.

10. The method according to claim 8, wherein the first target register is MSR_MISC_PWR_MGMT.

11. The method according to claim 10, wherein an address of the first target register is 0x1AA.

12. The method according to claim 8, wherein the first target bit is a sixth bit.

13. The method according to claim 8, wherein the modifying a value corresponding to a second target bit of a second target register in the CPU according to the intermediate struct comprises:
    setting the value corresponding to the second target bit of the second target register in the CPU to 1 according to the intermediate struct.

14. The method according to claim 13, wherein the second target register is MSR_IA32_PM_ENABLE.

15. The method according to claim 14, wherein an address of the second target register is 0x770.

16. The method according to claim 13, wherein the second target bit is a $0^{th}$ bit.

17. A computer device comprising:
    a memory, a processor, and computer-readable instructions stored on the memory and executable by the processor, wherein upon execution of the computer-readable instructions by the processor, the processor is configured to:
    add a power management handover option in a basic input output system (BIOS) power management interface;
    set an option value corresponding to the power management handover option as a Native Mode;
    save the Native Mode to an intermediate struct, the intermediate struct comprises an intermediate struct variable and an intermediate struct variable value, the intermediate struct variable being the power management handover option and the intermediate struct variable value being the Native Mode; and modify bits of target registers in a central processing unit (CPU) according to the intermediate struct when the CPU supports the hardware-controlled performance states, whereby a control right for power management is handed over from a BIOS to an operating system (OS), and the OS acquires the control right for power management.

18. A non-volatile computer-readable storage medium storing thereon computer-readable instructions, the computer-readable instructions, when executed by a processor, are configured to cause the processor to:

add a power management handover option in a basic input output system (BIOS) power management interface;

set an option value corresponding to the power management handover option as a Native Mode;

save the Native Mode to an intermediate struct, the intermediate struct comprises an intermediate struct variable and an intermediate struct variable value, the intermediate struct variable being the power management handover option and the intermediate struct variable value being the Native Mode; and modify bits of target registers in a central processing unit (CPU) according to the intermediate struct when the CPU supports the hardware-controlled performance states, whereby a control right for power management is handed over from a BIOS to an operating system (OS), and the OS acquires the control right for power management.

19. The computer device according to claim 17, wherein option values corresponding to the power management handover option further comprise any one or more of a Disabled Mode, a Native Mode with No Legacy Support, and an Out of Band Mode.

20. The computer device according to claim 19, wherein the processor, upon execution of computer-readable instructions, is further configured to:

when one of the option values corresponding to the power management handover option is the Disabled Mode, the OS adjusts the power management handover option through a conventional advanced configuration and power interface (ACPI).

\* \* \* \* \*